United States Patent [19]
Goto

[11] Patent Number: 5,664,232
[45] Date of Patent: Sep. 2, 1997

[54] MINI-STUDIO EQUIPMENT

[75] Inventor: Teruki Goto, Saitama, Japan

[73] Assignee: Kabushiki Kaisha S & T Studio, Tokyo, Japan

[21] Appl. No.: 528,462

[22] Filed: Sep. 14, 1995

[30]     Foreign Application Priority Data

Sep. 21, 1994  [JP]  Japan .................................. 6-226254
Sep. 8, 1995   [JP]  Japan .................................. 7-231155

[51] Int. Cl.⁶ .......................... G03B 15/06; G03B 27/52
[52] U.S. Cl. .................... 396/1; 396/4; 355/21; 355/70
[58] Field of Search .......................... 354/80, 290, 292, 354/293; 355/21, 67, 70; 362/16, 17, 18; 396/1, 2, 3, 4, 5, 419, 428, 429

[56]            References Cited

U.S. PATENT DOCUMENTS

| | | | |
|---|---|---|---|
| 1,635,741 | 7/1927 | Carpio | 355/70 |
| 1,953,471 | 4/1934 | Eich | 355/67 |
| 2,697,961 | 12/1954 | Casselman et al. | 354/293 |
| 3,611,897 | 10/1971 | Owens, Jr. | 354/290 |
| 4,076,413 | 2/1978 | Smeaton | 354/80 |
| 5,450,173 | 9/1995 | Bekanich | 355/67 |

*Primary Examiner*—Safet Metjahic
*Assistant Examiner*—Eddie C. Lee
*Attorney, Agent, or Firm*—Jordan and Hamburg

[57]            ABSTRACT

Mini-studio equipment allows a person who does not have highly developed photography techniques to take pictures of consistent quality in a shortened period of time, and makes it possible to easily move the studio, thereby widening the area of use. The mini-studio equipment includes an upper box, a middle box, and a lower box. An upper light source is attached to an upper wall of the upper box, and a light diffusion plate is provided as a bottom wall of the upper box so as to diffuse light emitted by the upper light source. The middle box has an upper opening which is covered by the light diffusion plate of the upper box. A photography stage is provided as a bottom wall of the middle box so as to diffuse light from the lower side thereof. The photography stage has a curved portion and a backdrop portion covering a side wall of the middle box. A camera installing window is provided at a central portion of another side wall which is opposed to the side wall covered by the backdrop portion. The lower box has an upper opening which is covered by the photography stage of the middle box, and a lower light source attached to a bottom wall of the lower box. A digital camera is disposed at the camera installing window, and digital output from the digital camera is input to a personal computer.

13 Claims, 3 Drawing Sheets

FIG.2A FIG.2B
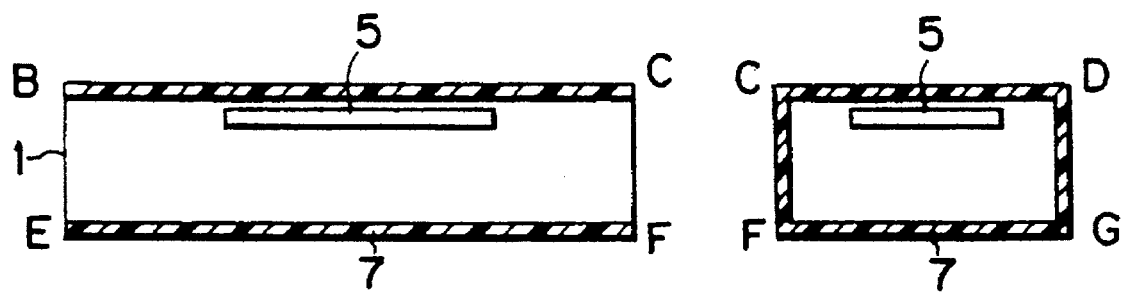
FIG.3A FIG.3B
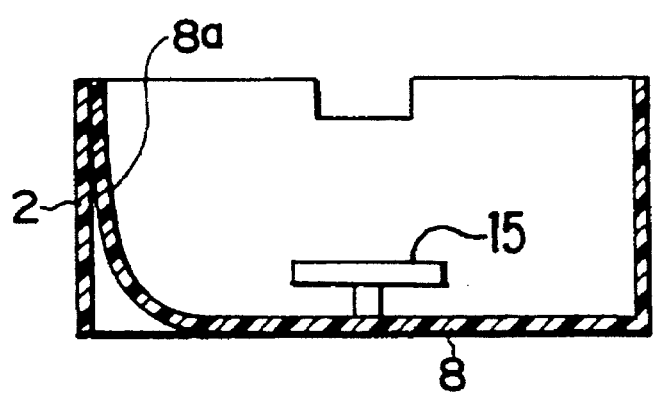
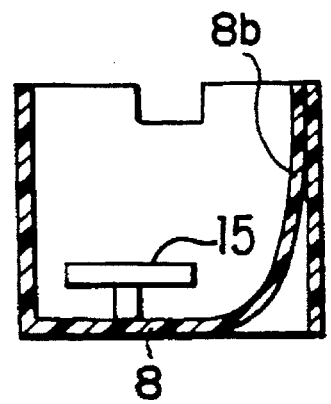

MINI-STUDIO EQUIPMENT

BACKGROUND OF THE INVENTION

1. Field of the Invention

The present invention relates to mini-studio equipment which is used for photographing a stationary object such as jewelry.

2. Description of the Related Art

Conventionally, even a relatively small object is photographed by a skilled photographer in a photography studio using expensive facilities and materials and a lengthy process.

Whenever photography is performed, it is necessary to prepare a stage as a support, to install a white or gray paper as a background, and to place an object to be photographed on the stage. Also, in cases where a source of illumination such as an electric flash or a tungsten lamp is used to illuminate an object to be photographed, the source of illumination must be rearranged whenever photography is performed. Since it is difficult to completely reproduce lighting conditions, the quality of pictures varies. Also, a considerable time is required to adjust lighting conditions to eliminate such a variation. The cost of the above-mentioned facilities and the cost and time required for lighting adjustment are a considerable portion of the overall costs of the photography.

In a conventional photography studio, a stage setting of a large scale is required irrespective of the size of the object to be photographed. Therefore, it is difficult to reduce photography costs even when the sizes of objects are limited and only a reasonable quality is needed. Also, in the case where the transportation of an object to be photographed to a studio is not possible, the studio facilities cannot be used, and therefore it is difficult to maintain the quality of photography at a suitable level. Moreover, in the case where photography is performed using a silver halide film, the film is transported to a laboratory to process the film. Since the quality of pictures cannot be checked during the photographing, a system has been demanded which allows a user to check the quality of photography up to the final stage on site.

Recently, electronic cameras (called digital cameras) have developed to a degree that they can be used for commercial photography.

Moreover, when the total balance of the equipment of a photography studio is considered, it can be found that there is no benefit to use expensive equipment only at part of the studio. Therefore, a need arises to reduce costs by averaging the grades of various equipment.

SUMMARY OF THE INVENTION

The present invention has been accomplished by taking the above-mentioned facts into consideration so as to eliminate the need for a photographer to use highly expensive equipment in a photography studio.

An object of the present invention is to provide mini-studio equipment which can provide a balance among efficiency, costs, and other factors, and which can be used for various purposes.

Another object of the present invention is to provide mini-studio equipment which can control the amount of light from an electric flash or other illumination source and can uniformly diffuse the light within the studio equipment, thereby making the best use of the characteristics of a digital camera or a camera using a silver halide film.

Still another object of the present invention is to provide mini-studio equipment which allows a person who does not have highly developed photography techniques to take pictures of consistent quality in a shortened period of time.

Yet another object of the present invention is to provide mini-studio equipment which allows a user to easily move the studio, thereby widening the area of use.

To achieve the above-described objects, mini-studio equipment according to the present invention comprises an upper box, a middle box, and a lower box. An upper light source with an adjustable output is attached to an upper wall of the upper box, and a light diffusion plate is provided as a bottom wall of the upper box to diffuse the light emitted by the upper light source. The middle box has an upper opening which is covered by the light diffusion plate of the upper box, and a photography stage is provided as a bottom wall of the middle box. The photography stage diffuses light from the lower side thereof and has a curved portion and a backdrop portion which covers a side wall of the middle box. A camera installing window is provided at the central portion of another side wall which is opposed to the side wall covered by the backdrop portion. The lower box has an upper opening which is covered by the photography stage of the middle box. A lower light source with an adjustable output is attached to a bottom wall of the lower box. A camera is disposed at the camera installing window. When a digital camera is used, digital output from the digital camera is input to a personal computer.

Preferably, the upper box is connected to the middle box such that the upper box can be opened and closed, thereby making it easier to place an object into the middle box. The upper light source and lower light source provided in the upper and lower boxes may operate as a point light source, surface light source, or line light source.

Preferably, a jig is attached to the outer side of a side wall of the lower box, a panhead is attached to the jig, and the camera is mounted on the panhead. The camera is positioned at a predetermined position in the camera installing window by adjusting the panhead.

Also, a pair of side light sources with an adjustable output is preferably provided on the inner side of the side wall of the middle box, which side wall has the camera installing window, such that the side light sources are located at opposite longitudinal ends of the side wall. The side light sources can be vertically moved and can be rotated.

Preferably, the side wall of the middle box, which side wall has the camera installing window, has a structure like a sliding door, so that it can be opened and closed.

Preferably, a rotary table is provided on the photography stage.

When the mini-studio equipment is used, the upper box is opened or one of the side walls, having a sliding door structure, of the middle box is opened to place an object on the photography stage of the middle box. After the object is positioned, the upper box is closed. The shape of the object is confirmed using a molybdenum lamp of the upper light source.

When a digital camera is used and the aperture of the camera is adjusted, the amounts of light from the upper and lower light sources are automatically and optimally controlled. After that, photography is performed. When a digital camera is used, the aperture can be made considerably smaller compared to the case where a camera using a silver halide film is used. Accordingly, an electric flash or other illumination source can provide a sufficient amount of light at two or three tenths of its maximum output. This makes it possible to adjust lighting conditions for various purposes at reduced costs.

The result of photography can be checked on a screen of a personal computer in real time. This allows a user to store only the best picture onto a disc of the personal computer.

The manner of outputting the picture can be selected by the personal computer in accordance with the needs of a user. That is, the picture may be printed on paper, or transmitted to an image processing apparatus, or stored as data. The personal computer, etc., are placed on a rack with casters, and are situated adjacent to the mini-studio equipment of the present invention when they are used.

BRIEF DESCRIPTION OF THE DRAWINGS

FIGS. 2A and 2B are a front sectional view and a side sectional view of an upper box of the mini-studio equipment shown in FIG. 1;

FIGS. 3A and 3B are a front sectional view and a side sectional view of a middle box of the mini-studio equipment shown in FIG. 1.

DESCRIPTION OF THE PREFERRED EMBODIMENT

Figure 1:
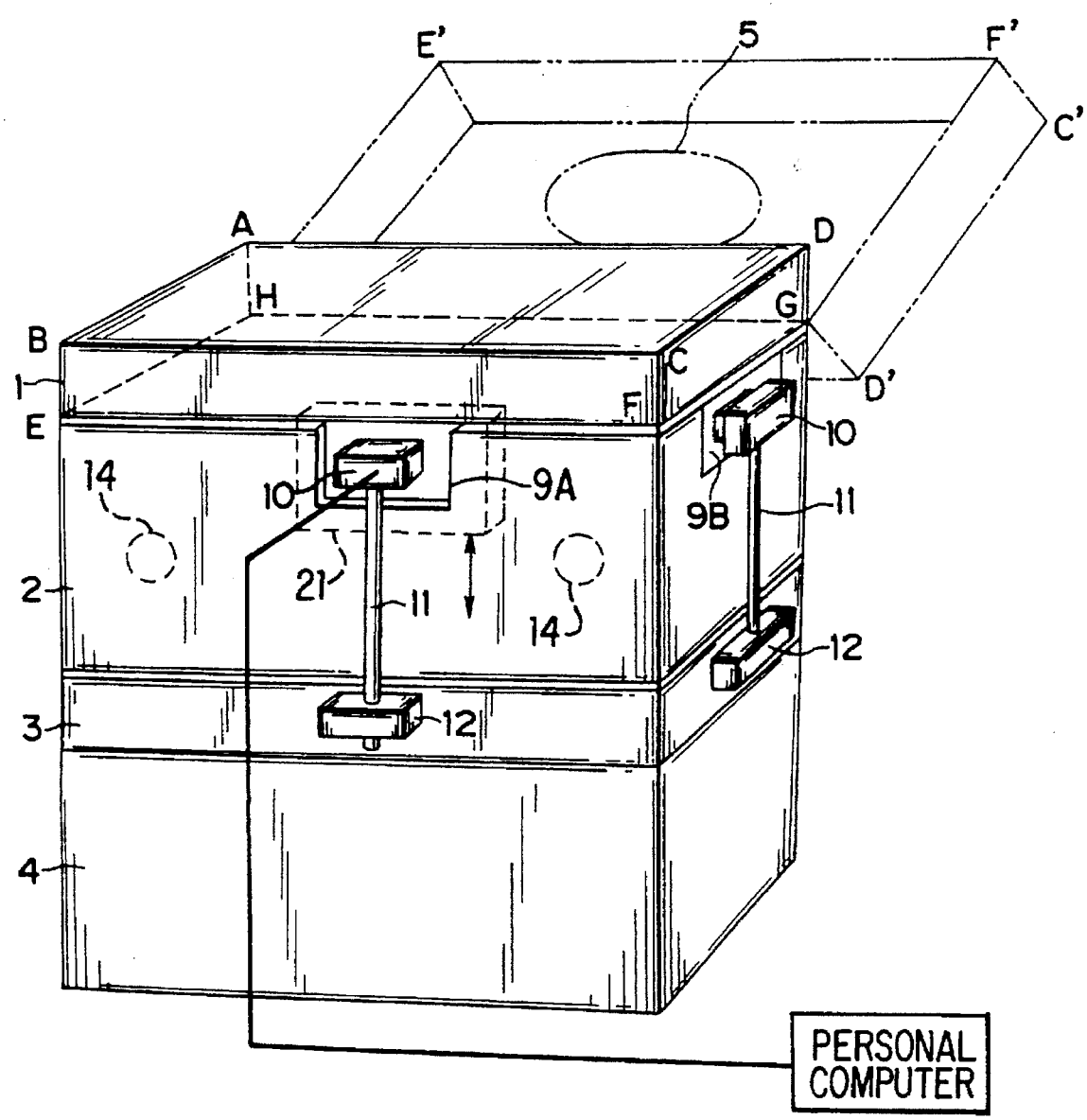
FIG. 1 is a perspective view of mini-studio equipment according to the present invention.

FIG. 1 is a perspective view of mini-studio equipment according to the present invention. As shown in FIG. 1, the mini-studio equipment is mainly composed of three boxes, i.e., an upper box 1, a middle box 2, and a lower box 3.

An upper light source 5 is attached to the upper wall of the upper box 5. The upper light source 5 can operates as a point light source, surface light source, or line light source in accordance with the setting of a camera 10 or the setting of a controller for the upper light source 5. The upper light source 5 is caused to emit light by a light source generator 6 which is built in a base 4 provided under the lower box 3.

A diffusion plate 7 is provided as a bottom wall of the upper box 1 so as to diffuse the light emitted by the upper light source 5. The diffusion plate 7 is preferably made of a material which can sufficiently diffuse light. For example, a milky acrylic plate is used. When a milky acrylic plate is used, light can be reflected and distributed in a widened area, so that a uniform illumination can be obtained by using a small number of light sources. The upper box 1 is connected to the middle box 2 such that the upper box 1 can be rotated about a line GH for opening and closing operations, as illustrated by a broken line in FIG. 1. When an object is placed into the middle box 2, the upper box 1 is opened, which is then closed before photography. The upper box 1 shuts light coming from the periphery of the mini-studio equipment.

The middle box 2 provides a space in which an object is placed. When the upper box 1 is closed, the upper opening of the middle box 2 is covered by the diffusion plate 7 of the upper box 1. A photography stage 8 is provided as a bottom wall of the middle box 2. The photography stage 8 diffuses a light from a lower light source 13 and is provided with curved portions and backdrop portions 8a and 8b which cover side walls of the middle box 2. Each of the backdrop portions 8a and 8b is used as a background located behind an object. In detail, as shown in FIGS. 2A and 2B, the photography stage 8 has curved portions, and the backdrop portions 8a and 8b are upwardly extended from the curved portions toward the side walls, as shown in FIGS. 3A and 3B. In the case where the camera 10 is required to be situated at one position only, one of the backdrop portions 8a and 8b may be omitted.

A camera installing windows 9A and 9B are formed at the central portions of two side walls of the middle box 2, which side walls are opposed to the side walls covered by the backdrop portions 8a and 8b, respectively. The backdrop portion 8b opposite the window 9A has a horizontally elongated rectangular shape, and the distance between an object and the camera 10 will become relatively short. Accordingly, the window 9A is preferably used to photograph an object having a horizontally elongated shape. In contrast, when the window 9B is used, the distance between an object and the camera 10 will become relatively long. Accordingly, the window 9B is preferably used to photograph a tall object.

Among the side walls, two side walls having the camera installing windows 9A and 9B may have a structure like a sliding door 21, so that these side walls can be opened and closed. This structure makes it easier to position an object to be photographed. Also, a rotary table may be provided on the photography stage 8. If an object to be photographed is placed on the rotary table, the angle of the object can be easily changed. In order to allow a user to rotate the rotary table without touching the object, a motor or the like may be provided in the lower box 3 or the base 4 to rotate the rotary table. The motor may be controlled by an unillustrated controller.

Figure 4A:
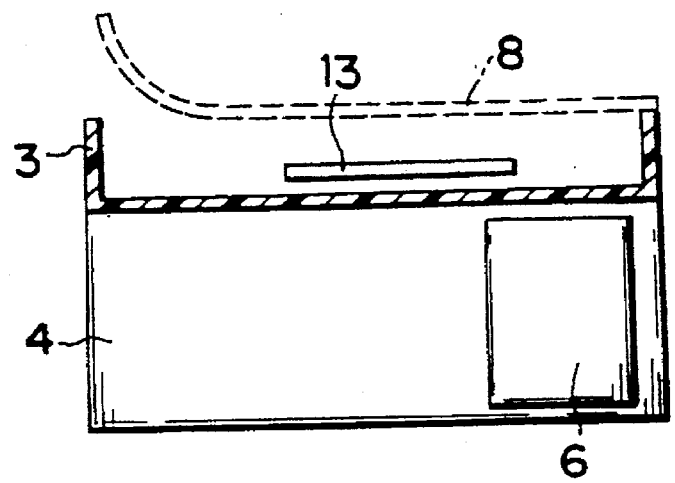
FIGS. 4A and 4B are a front sectional view and a side sectional view of a lower box of the mini-studio equipment shown in FIG. 1.
Figure 4B:
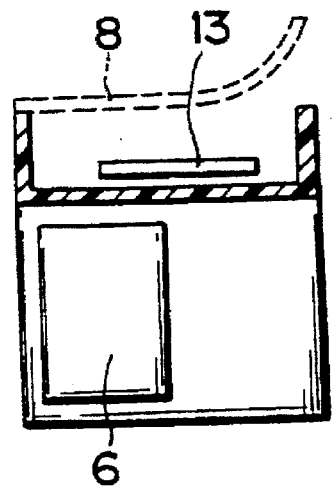

The upper opening of the lower box 3 is covered by the photography stage 8 of the middle box 2. The lower light source 13 is attached to the bottom wall of the lower box 3, as shown in FIGS. 4A and 4C. Like the upper light source 5, the lower light source 13 can operate as a point light source, surface light source, or line light source. The photography stage 8 is preferably made of a milky acrylic. plate. The color of the background under an object to be photographed can be changed to gray, white, or pure white by changing light from the lower light source 13. The upper light source 5 and the lower light source 13 comprise electric flashes, molybdenum lamps, or other light emitting devices.

The layout of the upper light source 5 and the lower light source 13 is determined in accordance with an idea of a professional photographer. For example, it is preferred that four electronic flashes or molybdenum lamps be disposed in a Y-shaped pattern in the upper light source 5, and three electronic flashes or molybdenum lamps be linearly disposed in the lower light source 13.

Preferably, a pair of side light sources 14 are provided on the inner side of each of the side walls of the middle box, which side walls have the camera installing windows, such that the total number of the light sources becomes 9 including the two side light sources. Each of the side light sources can be vertically moved and can be rotated. This makes it possible to change the lighting pattern by providing a highlight, shadow or the like.

As shown in FIG. 1, jigs 12 are attached to the outer sides of two side walls of the lower box 3, and a panhead 11 is attached to each jig 12. The camera 10 is mounted on one of the panheads 11. The camera 10 is then positioned at a predetermined position in the camera installing window 9A or 9B by adjusting the corresponding panhead 11. The determination as to whether the camera 10 is disposed in the window 9A or the window 9B is made depending on the shape of an object to be photographed as previously described.

When a digital camera is used as the camera 10, the output of the camera 10 is input to a personal computer. An image captured by the camera 10 is converted into image data by the computer, and the captured image is reproduced on a CRT screen. The output of the camera 10 may be modified or combined with other images by an image processing apparatus.

The base 4 provided under the lower box 3 holds the mini-studio equipment at a height suitable for easy photography and provides a space in which the light source generator 6 and the motor for the rotary table are built.

Since the mini-studio equipment according to the present invention has the above-described structure, it allows not only a professional photographer but also a person having no expert technical knowledge to take a photograph of a three-dimensional object very easily as if he or she makes a photo copy thereof.

Also, since the mini-studio equipment according to the present invention has functions as a studio, a camera and an output unit, photography can be efficiently performed in site. Moreover, since the structural components of the mini-studio equipment are integrated in a reduced size, the equipment can be carried over to a place at which an object to be photographed is present.

What is claimed is:

1. Mini-studio equipment comprising:

an upper box, a middle box, and a lower box;

said upper box having an upper light source with an adjustable output which is attached to an upper wall of said upper box, and a light diffusion plate which forms a bottom wall of said upper box so as to diffuse light emitted by said upper light source;

said middle box having an upper opening which is covered by said light diffusion plate of said upper box, a photography stage which forms a bottom wall of said middle box so as to diffuse light from the lower side thereof and which has a curved portion and a backdrop portion covering a side wall of said middle box, and a camera installing window provided at a central portion of another side wall which is opposed to the side wall covered by said backdrop portion;

said lower box having an upper opening which is covered by said photography stage of said middle box, and a lower light source with an adjustable output which is attached to a bottom wall of said lower box; and a digital camera is disposed at said camera installing window, and a personal computer receiving digital output from said digital camera.

2. Mini-studio equipment comprising:

an upper box, a middle box, and a lower box;

said upper box having an upper light source with an adjustable output which is attached to an upper wall of said upper box, and a light diffusion plate which forms a bottom wall of said upper box so as to diffuse light emitted by said upper light source;

said middle box having an upper opening which is covered by said light diffusion plate of said upper box, a photography stage which forms a bottom wall of said middle box so as to diffuse light from the lower side thereof and which has a curved portion and a backdrop portion covering a side wall of said middle box, and a camera installing window provided at a central portion of another side wall which is opposed to the side wall covered by said backdrop portion;

said lower box having an upper opening which is covered by said photography stage of said middle box, and a lower light source with an adjustable output which is attached to a bottom wall of said lower box; and a camera is disposed at said camera installing window.

3. Mini-studio equipment according to claim 1 or 2, wherein said upper box is connected to said middle box such that said upper box is allowed to be opened and closed.

4. Mini-studio equipment according to claim 1 or 2, wherein each of said upper light source and said lower light source operates as a point light source, a surface light source, or a line light source.

5. Mini-studio equipment according to claim 1 or 2, further comprising a jig attached to an outer side of a side wall of said lower box, a panhead attached to said jig, and said camera being mounted on said panhead and positioned at a predetermined position in said camera installing window by adjusting said panhead.

6. Mini-studio equipment according to claim 1 or 2, further comprising a pair of side light sources with an adjustable output provided on an inner side of a side wall of said middle box, which side wall has said camera installing window, such that said side light sources are located at opposite longitudinal ends of said side wall.

7. Mini-studio equipment according to claim 1 or 2, further comprising a sliding door on said side wall of said middle box for opening and closing said camera installing window.

8. Mini-studio equipment according to claim 1 or 2, wherein a rotary table is further provided on said photography stage.

9. A mini-studio apparatus comprising:

an upper box, a middle box, and a lower box;

said upper box having an upper light source with an adjustable output which is attached to an upper wall of said upper box, and a light diffusion plate which forms a bottom wall of said upper box so as to diffuse light emitted by said upper light source;

said middle box having an upper opening which is covered by said light diffusion plate of said upper box, a photography stage which forms a bottom wall of said middle box so as to diffuse light from the lower side thereof and which has a curved portion and a backdrop portion covering a side wall of said middle box, and a camera installing window provided at a central portion of another side wall which is opposed to the side wall covered by said backdrop portion; and said lower box having an upper opening which is covered by said photography stage of said middle box, and a lower light source with an adjustable output which is attached to a bottom wall of said lower box.

10. The mini-studio apparatus according to claim 9 wherein said upper box is connected to said middle box such that said upper box is allowed to be opened and closed.

11. The mini-studio apparatus according to claim 9 wherein each of said upper light source and said lower light source operates as a point light source, a surface light source, or a line light source.

12. The mini-studio apparatus according to claim 9 further comprising a jig attached to an outer side of a side wall of said lower box, a panhead attached to said jig, and said camera being mounted on said panhead and positioned at a predetermined position in said camera installing window by adjusting said panhead.

13. The mini-studio apparatus according to claim 9 further comprising a pair of side light sources with an adjustable output provided on an inner side of a side wall of said middle box such that said side light sources are located at opposite longitudinal ends of said side wall.

* * * * *